US008192573B2

(12) United States Patent
Leykamm

(10) Patent No.: US 8,192,573 B2
(45) Date of Patent: Jun. 5, 2012

(54) APPARATUS AND METHOD FOR APPLYING LABELS SUPPLIED FROM A ROLL TO CONTAINERS

(75) Inventor: Dieter Leykamm, Neutraubling (DE)

(73) Assignee: Krones AG, Neutraubling (DE)

( * ) Notice: Subject to any disclaimer, the term of this patent is extended or adjusted under 35 U.S.C. 154(b) by 0 days.

(21) Appl. No.: 12/634,272

(22) Filed: Dec. 9, 2009

(65) Prior Publication Data

US 2010/0147454 A1 Jun. 17, 2010

(30) Foreign Application Priority Data

Dec. 12, 2008 (DE) ........................ 10 2008 061 976

(51) Int. Cl.
*B29C 65/00* (2006.01)
*B32B 37/00* (2006.01)
*B32B 38/04* (2006.01)

(52) U.S. Cl. ........ 156/256; 156/264; 156/271; 156/521; 156/353; 156/354; 156/361

(58) Field of Classification Search .................. 156/264, 156/270, 521, 256, 353, 354, 361
See application file for complete search history.

(56) References Cited

U.S. PATENT DOCUMENTS

| | | | | |
|---|---|---|---|---|
| 3,235,433 | A | 2/1966 | Cvacho et al. | |
| 3,235,443 | A | 2/1966 | Greenman | |
| 3,765,991 | A | 10/1973 | Hoffmann | |
| 4,500,386 | A | 2/1985 | Hoffman | |
| 4,544,431 | A * | 10/1985 | King | 156/256 |
| 5,380,381 | A | 1/1995 | Otruba | |
| 6,086,694 | A * | 7/2000 | Winter et al. | 156/64 |
| 6,485,803 | B1 | 11/2002 | Bright | |
| 6,772,663 | B2 * | 8/2004 | Machamer | 83/37 |
| 7,341,089 | B2 * | 3/2008 | Puffe et al. | 156/578 |
| 2006/0201630 | A1 | 9/2006 | Puffe | |
| 2009/0071608 | A1 | 3/2009 | Thomas | |

FOREIGN PATENT DOCUMENTS

| | | |
|---|---|---|
| CH | 6 92 567 | 8/2002 |
| DE | 196 46 732 | 5/1998 |
| DE | 20 2005 002 793 | 5/2005 |
| DE | 10 2005 041 531 | 3/2007 |
| DE | 20 2007 001 964 | 5/2007 |
| DE | 102007009484 | 8/2008 |
| EP | 11 22 174 | 8/2001 |
| WO | W02007005396 | 1/2007 |
| WO | WO 2007/1 10 738 | 4/2007 |
| WO | WO 2008/019830 | 2/2008 |
| WO | WO 2008019829 | 2/2008 |
| WO | WO 2008101527 | 8/2008 |

* cited by examiner

*Primary Examiner* — Linda L Gray
(74) *Attorney, Agent, or Firm* — Simpson & Simpson, PLLC

(57) ABSTRACT

An apparatus and a method for applying labels (100) supplied from a roll for the labeling of containers (10) are disclosed. The containers (10) are fed to a labeling station (12). A cutting device (1) provides the required length (103) of the labels (100). The cutting device (1) can be variably controlled according to the circumference of the container (10).

3 Claims, 3 Drawing Sheets

APPARATUS AND METHOD FOR APPLYING LABELS SUPPLIED FROM A ROLL TO CONTAINERS

CROSS REFERENCE TO RELATED APPLICATIONS

This patent application claims priority of German Patent Application No. DE 10 2008 061 976.0, filed on Dec. 12, 2008, the application is incorporated herein by reference.

FIELD OF THE INVENTION

The present invention relates to an apparatus for applying labels supplied from a roll to containers.

The invention further relates to a method for applying labels supplied from a roll.

BACKGROUND OF THE INVENTION

For labeling processes at high throughput mostly endless label dispensers are used, which are spooled onto a roll core to form a roll of labels. This type of labeling facilitates rather uninterrupted labeling, as it is also possible to provide several rolls of labels in a storage unit, which are supplied to the labeling machine without interruption, if required.

A labeling machine is known for example from the German utility model DE 20 2005 002 793 U1, which provides amongst other things a high speed cutting unit for endless label bands, wherein the rolls are used in a labeling machine. The cutting unit comprises a rotating vacuum roll with an also rotating cutting element. In order to achieve as large as possible variation of the cut length, both the vacuum roll and the cutting element are provided with a drive each. With the apparatus of the utility model various lengths of the labels can be provided, which are applied as wrap-around labels to various types of container like cans, PET-bottles, glass bottles, tins, glass jars or buckets.

The U.S. Pat. No. 3,235,433 also discloses a method and an apparatus for applying labels to containers. The labels are transported by a revolving belt and lie on separate pads. These pads are separated from each other by gaps. A cutting device engages these gaps to separate the labels. In order to use a different label length it is necessary to retrofit the transport belt for the labels, so that labels of a different length can be produced. The length of the labels is determined by the distance between the gaps on the belt.

The European patent application EP 2 042 437 A1 filed on Sep. 3, 2007, (internal document number ROPE 01 254-EP) discloses a wrap-around labeling apparatus. Here, too, a roll of labels is used and supplied to a corresponding cutting device, which separates the individual labels from the rolled material. However, the apparatus disclosed herein only provides labels of a length to completely wrap around the container to be labeled. Furthermore this document discloses how to design the cutting device taking into consideration the thermal expansion coefficients of the individual components so that also at high throughput of the cutting device there is no shift of the length of the labels and no change in the cutting quality of the cutting device due to thermal expansion.

SUMMARY OF THE INVENTION

It is an object of the invention to provide an apparatus for applying labels supplied from a roll to containers, wherein the labels are designed to allow for an environmentally friendly and resource-efficient application of the labels to the containers.

This object is achieved by the apparatus for applying labels supplied from a roll for labeling containers comprising:

- at least one container feeding device;
- a container table;
- a container discharge device; and
- at least one labeling station, wherein the labeling station has at least a roll with rolled material for the labels, a label feeding device, a cutting device and a glue unit and the cutting device is controllable according to a circumference of the container in such a way that the labels are separable from the roll with respect to their length in such a way that the length is smaller than the circumference of the container.

It is a further object of the invention to provide a method for applying labels supplied from a roll to containers, which allows for an environmentally friendly and resource-efficient application of the labels.

The above object is achieved by the method for applying labels supplied from a roll, comprising the steps of:

- removing a rolled material for a label from a roll;
- adjusting a cutting device via a control unit for cutting a required length of the label from the rolled material to form a cut label;
- applying an adhesive on at least a leading region and on at least a tail region of the label in a glue unit; and
- applying the cut label with the adhesive applied on the cut label to a circumference of a container in a labeling station, wherein the length is such that the leading region and the tail region of the label applied to the container are spaced apart from each other.

For this purpose the cutting device has assigned a control unit provided with an input unit. The length of the label can be set via the input unit. Thus it is easy to reduce the length of the label so that the label does no longer form a full wrap-around label for the container. If, for example, a label is applied whose length corresponds to only half the circumference of the container, half the material for the label is saved. This reduces the environmental impact and in view of the high number of labels applied to containers, also a substantial reduction of costs is achieved.

The input unit can be a touch screen. Therefore it is easy for an operator of the labeling station to adjust the length of the labels to thus achieve the required reduction of environmental impact and costs. The adjustment of the cutting device is done in a simple way with two servo motors. The adjustment entered via the input unit is passed to the cutting device via these servo motors.

The glue unit is designed in such a way that an adhesive is applied at least on the leading region and at least on the tail region of the label. It is also conceivable that the glue unit applies, at least additionally and partially, adhesive between the leading region and the tail region. After the label has been applied to the container, the leading region and the tail region are spaced apart from each other. The label thus can no longer be considered a wrap-around label. Only by this reduction of the label material a reduction of the environmental impact and of the costs is possible.

In the method according to the invention for applying labels supplied on a roll to containers first the rolled material for the labels is removed from a roll. Via a control unit the cutting device is adjusted to cut the required length of the label from the rolled material. In the glue unit adhesive is applied at least on a leading region and at least on a tail region of the label. In the labeling station the cut label with adhesive applied is applied to the circumference of the container. The length of the label is such that the leading region and the tail region of the label applied to the container are spaced apart from each other.

BRIEF DESCRIPTION OF THE DRAWINGS

In the following, embodiments will explain the inventive method and the inventive apparatus and their advantages in more detail with reference to the accompanying drawings.

DETAILED DESCRIPTION OF THE INVENTION

Figure 1:
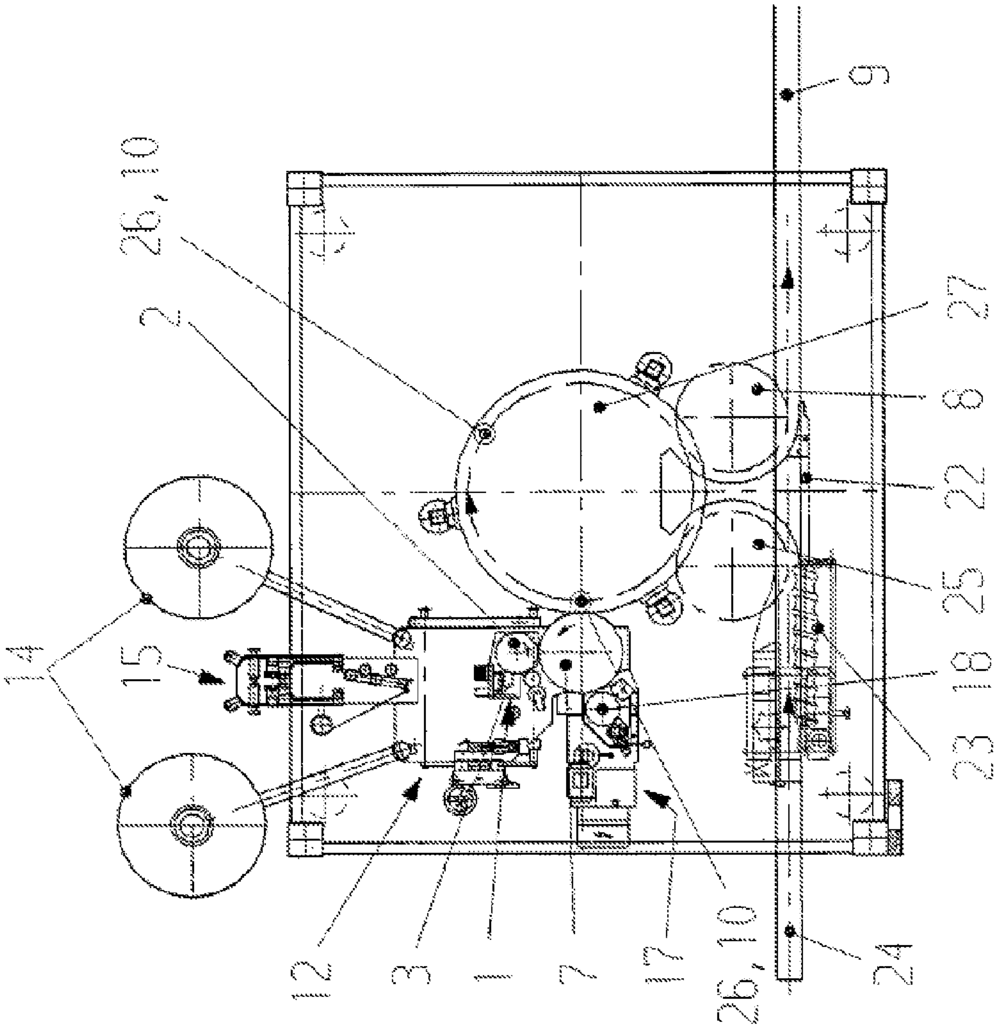
FIG. 1 shows a schematic top view of a labeling machine.

Identical reference numerals are used for like elements of the invention or elements of like function. For the sake of clarity only those reference numerals are shown in the individual figures, which are required for the description of the respective figure.

FIG. 1 shows a schematic top view of a labeling machine for the uninterrupted labeling of bottles 10 at high throughput, wherein the bottles 10 are continuously fed in a single TOW.

The labeling machine comprises a feeding conveyor 24, an infeed star wheel 25 with an infeed worm 23 before it, a guide curve 22, a carousel 27 with a plurality of turn tables 26 arranged equidistantly on a common arch, a discharge star wheel 8 and a discharge conveyor 9. The transport elements mentioned, which move the bottles 10 through the machine, are driven continuously in synchronicity with speed and position.

In the region between the infeed star wheel 25 and the discharge star wheel 8 a labeling station 12 is provided at the outer circumference of the carousel 27 for applying the labels. The labeling station comprises two receptacles 14 for rolls of labels, which supply the labels in the form of rolled material, with a splicing station 15 in between, a cutting device 1, a glue unit 18, and a gripper cylinder for transferring a cut label with adhesive on its, in the direction of transport, leading and tail edge onto a bottle 10 moving by.

The labeling process of the bottle 10 in detail is as follows: a bottle 10 supplied from the feeding conveyor 24 is, in cooperation with the infeed worm 23 positioned sideward, introduced into the infeed star wheel 25 correctly oriented and is pushed from there onto a turn table 26 of the rotating carousel 27 in a continuous motion with the help of the opposing guide curve 22. There the bottle 10 is axially clamped on the turn table 26 in such a way that the bottle 10 can rotate with the turn table 26 by a centering bell (not shown) that can be raised and lowered with respect to the turn table. The bottle 10 is transported tangentially to the cylinder 17 of the labeling station 12 by the rotary motion of the carousel 27.

Moving sideward in parallel the label band is taken in a controlled manner from one of the label band rolls 14 and supplied to a cutting device 1. The cut label, which during the cutting step is on the rotating vacuum roll 2 with the printed side facing outwards, is passed to the vacuum operated gripper cylinder 7 after the cutting step, from where it is moved past the glue roll with the backside facing outwards and has strips of adhesive 50 applied on the leading region 101 and on the tail region 102 of the label 100. This label with the strips of adhesive 50 on the leading region 101 and the tail region 102, is tangentially fed to the carousel 27, on which the bottles 10 are located. The strip of adhesive 50 on the leading region 101 of the label 100 is brought into contact with the bottle 10 and the label is spooled off by rotation of the bottle 10 about its axis, wherein the adhesive 50 on the tail region 102 of the label 100 is brought into contact with a further region on the circumference of the bottle 10, so that the label 100 sticks to the bottle 10 completely. The length of the label 100 is such that the label 100 does not reach around the circumference of the bottle 10. It is emphasized again that the label 100 does not constitute a wrap-around label. The length 103 of the label is smaller than the circumference of the bottle 10 or of the container to be labeled, respectively. The application of the label 100 described above is done during a continuous motion of the carousel 27. After passing the labeling station 12 and after termination of the spooling process the labeled bottle 10 reaches the discharge star wheel 8 and is passed to the discharge conveyor 9.

Figure 2:
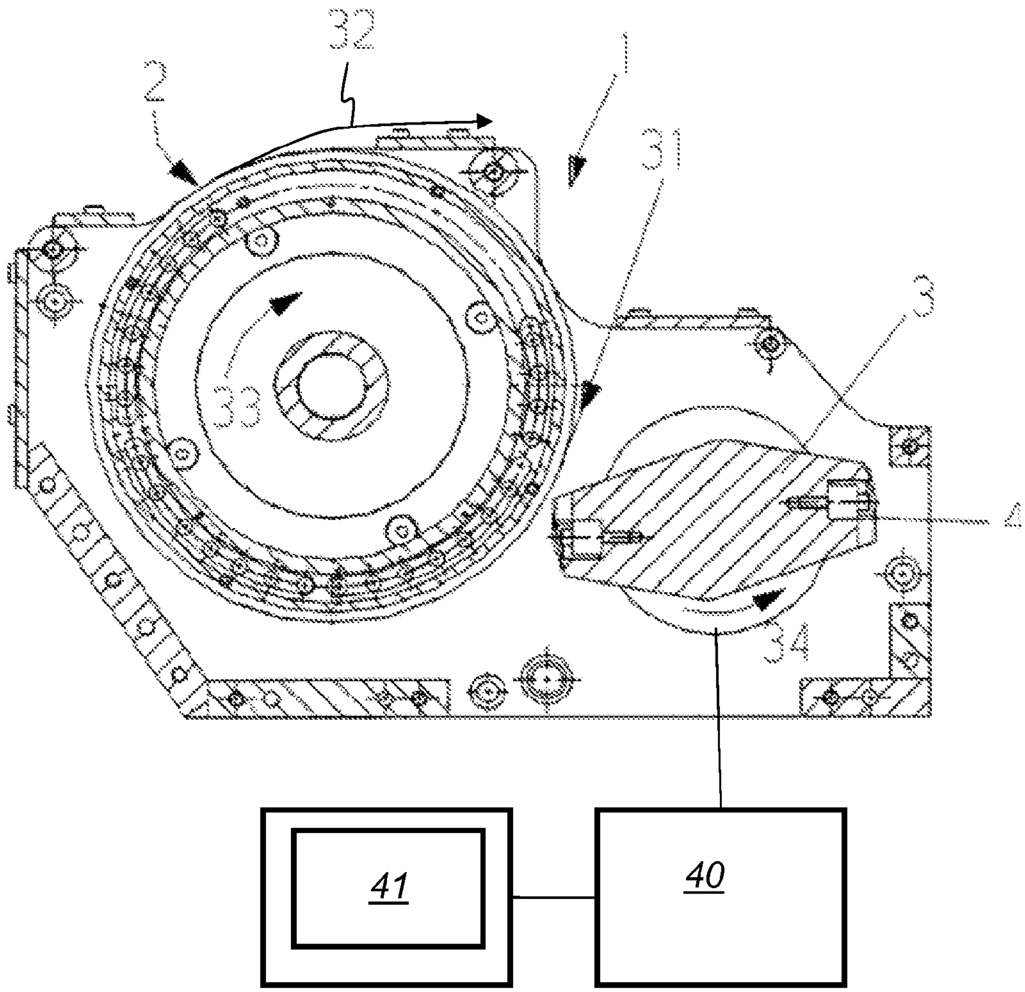
FIG. 2 shows a schematic top view of a cutting device of such a labeling machine.

FIG. 2 shows a detailed view of the cutting device 1 of the labeling station 12. The label band, which is taken from the rolled material 14, is fed to the cutting device 1 in the direction of the arrow 31 tangentially to the vacuum roll 2. The circumferential velocity of the vacuum roll 2 rotating in the direction of the arrow 33 is equal to the feeding speed of the label band, so that the transport of the label band on the vacuum roll 2 proceeds friction-locked without slip. A control unit 40 is assigned to the cutting device 1. Via the control unit 40 the timing of the cut can be adjusted, so that the control unit 40 can set and synchronize the circumferential velocities of the cutting element 3 and/or of the vacuum roll 2, in order to produce the desired length 103 of the label 100. It is taken into account that the circumferential velocity of the cutting tool 4, which is rotating in the cutting element 3 in the direction of the arrow 34, is equal to the circumferential velocity of the vacuum roll 2 and thus equal to the feeding speed of the label band. According to the present invention the circumferential velocities of the cutting element 3 and of the vacuum roll 2 are correlated thus that the length 103 of the label produced with the cutting device 1 is smaller than the circumference of the container to be labeled. Preferentially the length of the label is about half the circumference of the container to be labeled. The cutting device 1 can be adjusted in a particularly easy manner in order to adapt the length of the label 100 to be cut to the various types of containers, and so that a corresponding saving and reduction of the environmental impact can be achieved by reducing the length of the labels 100 for the various containers. For adjusting the cutting device 1 the control unit 40 is connected with an input unit 41. Via this input unit 41 the operator can set the required label length according to the type of container to be labeled. The input unit 41 preferentially is a touch screen. The labels cut from the label band exit the cutting device 1 in the direction of the arrow 32.

Figure 3:
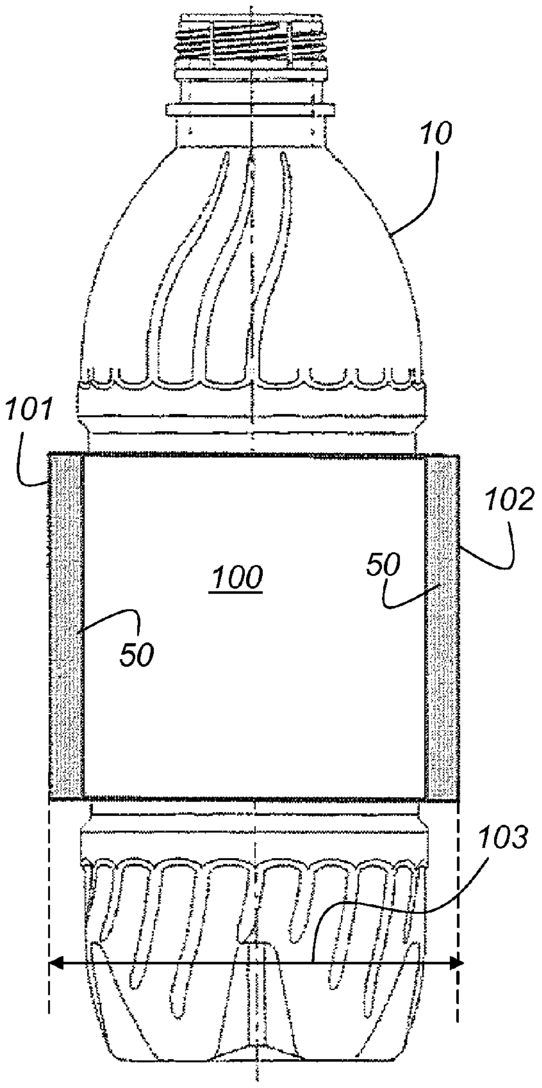
FIG. 3 shows a container to which is assigned a label with adhesive on the leading region and on the tail region, wherein the label has not been applied to the container yet.

FIG. 3 shows a bottle 10 together with a label 100 that has not yet been applied to the circumferential region of the bottle 10. The label has a leading region 101 and a tail region 102. For the attachment of the label 100 to the bottle 10 an adhesive 50 has been applied on the leading region 101 and the tail region 102. The label 100 has a length 103 which is smaller than the circumference of the container or bottle 10, respectively, to be labeled. As mentioned above, the length 103 of the label 100 is about half the circumference of the bottle 10.

Figure 4:
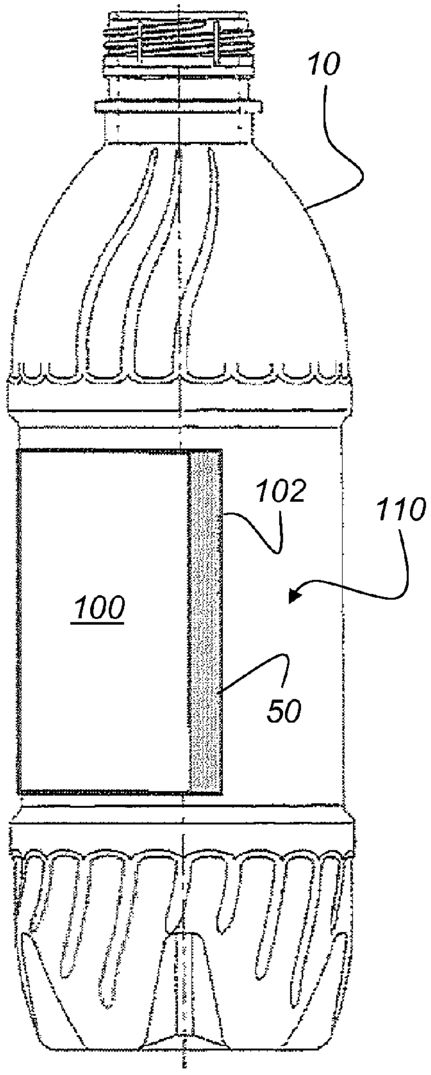
FIG. 4 shows the label applied to the container, wherein the label is no wrap-around label.

FIG. 4 shows a bottle 10 with the label 100 applied to a circumferential region 110 of the bottle 10. It is evident that the label 100 is not a wrap-around label. The label 100 only partially reaches round the circumference of the bottle 10. According to the invention it is possible to apply labels 100 to a large variety of containers and to design the labels in such a way that a reduction of the environmental impact and a reduction of the costs for the labels 100 can be achieved. According to the container to be labeled the cutting device can be adjusted via a control unit so that labels of the desired length are cut which do not reach round the circumference of the container completely. The desired adjustment of the cutting device can be done by corresponding servo motors. Thus no retrofit of the cutting device is necessary in order to produce labels of various lengths and to apply them to the container depending on the container type, wherein the label is no wrap-around label.

The invention has been described with reference to preferred embodiments. However, it is obvious to a person skilled in the art that alterations and modifications can be made without leaving the scope of the subsequent claims.

What is claimed is:

1. A method for applying labels supplied from a roll, comprising the steps of:

removing a rolled material for a label from a roll;

adjusting a cutting device via a control unit for cutting a required length of the label from the rolled material to form a cut label, the cutting device comprising a cutting element and a vacuum roll, the step of adjusting comprising correlating circumferential velocities of the cutting element and the vacuum roll, wherein the circumferential velocities of the cutting element and the vacuum roll are adjustable in order to adapt the required length of the label to be cut to different lengths, and wherein the required length is less than a circumference of a container;

applying an adhesive on at least a leading region and on at least a tail region of the label in a glue unit; and applying the cut label with the adhesive applied on the cut label to the circumference of the container in a labeling station, wherein the length is such that the leading region and the tail region of the label applied to the container are spaced apart from each other.

2. The method of claim 1, wherein the control unit comprises an input unit and the required length of the label is set by the input unit.

3. The method of claim 1, wherein the cutting device comprises two servo motors which adjust the cutting device to the required length of the label changed by an input unit.

* * * * *